(12) United States Patent
Sreekiran et al.

(10) Patent No.: US 11,054,500 B2
(45) Date of Patent: Jul. 6, 2021

(54) NOISE MEASUREMENT IN A RADAR SYSTEM

(71) Applicant: TEXAS INSTRUMENTS INCORPORATED, Dallas, TX (US)

(72) Inventors: Samala Sreekiran, Plano, TX (US);
Krishnanshu Dandu, Allen, TX (US);
Ross Kulak, Forth Worth, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 140 days.

(21) Appl. No.: 16/057,152

(22) Filed: Aug. 7, 2018

(65) Prior Publication Data

US 2019/0049555 A1    Feb. 14, 2019

Related U.S. Application Data

(60) Provisional application No. 62/542,665, filed on Aug. 8, 2017.

(51) Int. Cl.
*G01S 7/35*        (2006.01)
*G01S 7/40*        (2006.01)
(Continued)

(52) U.S. Cl.
CPC ............ *G01S 7/352* (2013.01); *G01S 7/4021* (2013.01); *H01Q 1/247* (2013.01);
(Continued)

(58) Field of Classification Search
CPC combination set(s) only.
See application file for complete search history.

(56) References Cited

U.S. PATENT DOCUMENTS

| 5,023,618 A | 6/1991 | Reits |
| 6,236,352 B1 * | 5/2001 | Walmsley ............. G01S 13/325 342/118 |

(Continued)

FOREIGN PATENT DOCUMENTS

WO    2016168334 A1    10/2016

OTHER PUBLICATIONS

Iovescu, Cesar; Rao, Sandeep; "The Fundamentals of Millimeter Wave Sensors," Texas Instruments Incorporated, May 2017.

(Continued)

*Primary Examiner* — Mamadou L Diallo
(74) *Attorney, Agent, or Firm* — Charles F. Koch; Charles A. Brill; Frank D. Cimino

(57) ABSTRACT

A radar system includes a transmitter including a power amplifier (PA) for amplifying a local oscillator (LO) signal, to generate an amplified signal. The radar system also includes a receiver including an IQ generator for generating an I signal based on the LO signal and for generating a Q signal based on the LO signal and a low noise amplifier (LNA) for amplifying a looped back signal, to generate a receiver signal. The receiver also includes a first mixer for mixing the receiver signal and the I signal, to generate a baseband I signal and a second mixer for mixing the receiver signal and the Q signal, to generate a baseband Q signal. Additionally, the radar system includes a waveguide loopback for guiding the amplified signal from the transmitter to the receiver as the looped back signal.

18 Claims, 7 Drawing Sheets

(51) Int. Cl.
*H01Q 1/32* (2006.01)
*H01Q 1/24* (2006.01)
*H01Q 3/36* (2006.01)

(52) U.S. Cl.
CPC ............ *H01Q 1/3233* (2013.01); *H01Q 3/36* (2013.01); *G01S 2007/358* (2013.01)

(56) References Cited

U.S. PATENT DOCUMENTS

| | | | |
|---|---|---|---|
| 7,737,880 | B2 | 6/2010 | Vacanti |
| 8,416,121 | B2 * | 4/2013 | Chen ................ G01S 13/34 342/103 |
| 9,564,671 | B2 * | 2/2017 | Carmon ................ H01P 5/10 |
| 10,446,938 | B1 * | 10/2019 | Wang ................ G01S 13/58 |
| 2004/0150548 | A1 * | 8/2004 | Walmsley ............ G01S 7/35 342/70 |
| 2005/0225476 | A1 | 10/2005 | Hoetzel |
| 2014/0125425 | A1 * | 5/2014 | Shen ................ H01P 5/107 333/26 |
| 2016/0109559 | A1 * | 4/2016 | Delbecq ............ G01S 13/34 342/170 |
| 2017/0031005 | A1 * | 2/2017 | Jaeger ................ H04L 27/36 |
| 2017/0153318 | A1 * | 6/2017 | Melzer ................ G01S 7/4056 |
| 2017/0168140 | A1 * | 6/2017 | Hosokawa ............ G01S 7/40 |

OTHER PUBLICATIONS

Singh, Jasbir; Ginsburg, Brian; Rao, Sandeep; Ramasubramanain, Karthik; "AWR1642 mmWave Sensor: 76-81-GHz Radar-On-Chip for Short-Range Radar Applications," Texas Instruments Incorporated, May 2017.

PCT Search Report for Application No. PCT/US 2018/045877, dated Nov. 29, 2018.

European Search Report for EP 18842995.5 dated Jul. 17, 2020.

\* cited by examiner

NOISE MEASUREMENT IN A RADAR SYSTEM

This application claims the benefit of U.S. Provisional Patent Application No. 62/542,665, filed on Aug. 8, 2017, entitled "A Novel Method to Measure Amplitude Noise/ Uncorrelated Phase Noise," which application is incorporated herein by reference in its entirety.

FIELD OF THE INVENTION

The present disclosure relates to noise measurement, and in particular, to noise measurement in a radar system.

BACKGROUND OF THE INVENTION

Driven by advanced safety features, the automotive industry is increasing the use of sensors deployed in automobiles, as well as the corresponding computational capacity. In many applications, such as collision warning and avoidance, adaptive cruise control, lane keeping, and autonomous parking, accurately perceiving the surroundings in a real-time manner is necessary for decision making and actuation. Radar systems may be used to ascertain information about the surroundings of an automobile.

In radar systems, a transmitter transmits a radar signal. Then, a receiver receives an echo of the transmitted signal, which is used to sense objects, including range, velocity, target size, target shape, and angular direction. The received echo signal includes noise, for example amplitude noise, uncorrelated phase noise, and correlated phase noise. It is desirable to measure the amplitude noise and the uncorrelated phase noise in radar systems.

SUMMARY OF THE INVENTION

An embodiment radar system includes a transmitter including a power amplifier (PA) for amplifying a local oscillator (LO) signal, to generate an amplified signal. The radar system also includes a receiver including an IQ generator for generating an I signal based on the LO signal and for generating a Q signal based on the LO signal and a low noise amplifier (LNA) for amplifying a looped back signal, to generate a receiver signal. The receiver also includes a first mixer for mixing the receiver signal and the I signal, to generate a baseband I signal and a second mixer for mixing the receiver signal and the Q signal, to generate a baseband Q signal. Additionally, the radar system includes a waveguide loopback for guiding the amplified signal from the transmitter to the receiver as the looped back signal.

An embodiment method of measuring noise in a radar system includes setting a phase shift of a variable phase shifter of the radar system and measuring, by a processor, a baseband I component of an amplified looped back phase shifted radar signal having the phase shift, to generate a measured I signal. The method also includes measuring, by the processor, a baseband Q component of an amplified looped back phase shifted radar signal having the phase shift, to generate a measured Q signal.

An embodiment radar system includes a power amplifier (PA) and a variable phase shifter coupled to the power amplifier. The radar system also includes a low noise amplifier (LNA) and a waveguide loopback coupling the PA and the LNA. Additionally, the radar system includes a first frequency mixer coupled to the LNA, a second frequency mixer coupled to the LNA, and an IQ generator coupled to the first frequency mixer and to the second frequency mixer.

DETAILED DESCRIPTION OF EXAMPLE EMBODIMENTS

Systems, such as radar systems, contain various types of noise, including amplitude noise (AN), uncorrelated phase noise (UPN), and correlated phase noise, also known as synth noise. An example of a signal containing noise is:

$$V(t) = A(1+\Delta A)\cos(\omega_o t + \phi_u(t) + \phi_c(t))$$

where $V(t)$ is the signal, $A$ is the amplitude of the signal, $\Delta A$ is the amplitude noise, $\omega_o$ is the carrier frequency, $t$ is time, $\phi_u$ is the uncorrelated phase noise, and $\phi_c$ is the correlated phase noise.

Figure 1A:
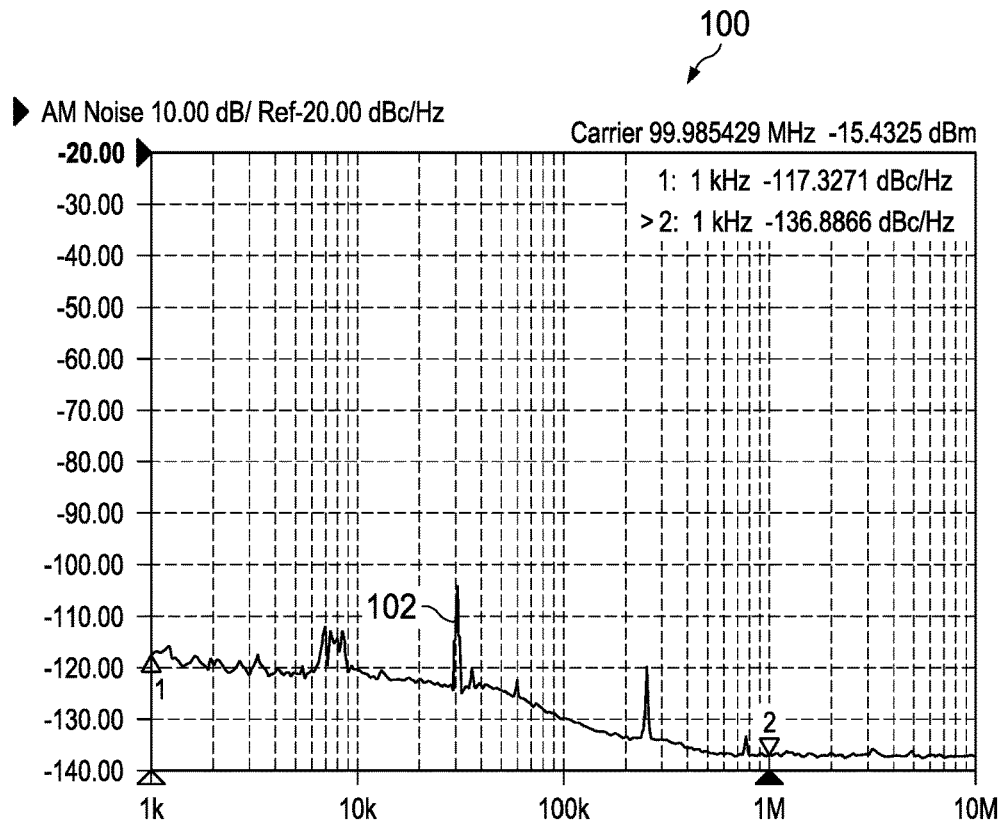
FIGS. 1A-B illustrate examples of amplitude noise and phase noise in an example radar system.
Figure 1B:
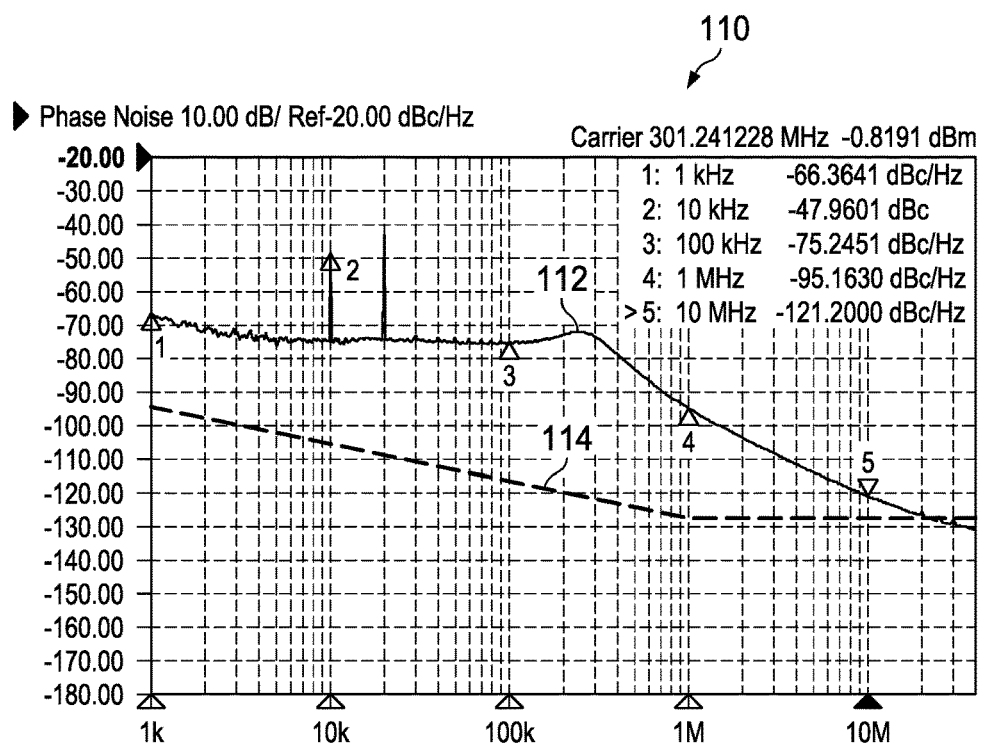

FIGS. 1A-B illustrate examples of amplitude noise and phase noise in an example radar system. FIG. 1A illustrates a graph 100, depicting amplitude noise 102 for an example radar system. An Agilent™ 5052B Signal Source Analyzer™ measures amplitude noise 102. Measured with a 1 MHz offset and a noise floor limited by the VDI™ head, the amplitude noise 102 is −136 dBc/Hz. Different radar systems may have different quantities of amplitude noise. As discussed, the amplitude noise measured by the Agilent™ 5052B Signal Source Analyzer™ is not a true indicator of the system amplitude noise, because the measurement is limited by the noise floor of the VDI head used for down-conversion.

FIG. 1B illustrates a graph 110, depicting phase noise, including correlated phase noise 112 and uncorrelated phase noise 114. An Agilent™ 5052B Signal Source Analyzer™ measured the correlated phase noise 112. Because the correlated phase noise dominates the uncorrelated phase noise, the uncorrelated phase noise 114 cannot be measured, and accordingly is derived or calculated.

In a radar system, amplitude noise and uncorrelated phase noise may be especially important to performance. Because of finite transmission (TX)/reception (RX) isolation, a bumper reflection may lead to TX amplitude noise and uncorrelated phase noise leaking into the receiver, which degrades the received noise floor. Additionally, reception under a large signal condition may lead to the noise floor being severely degraded by flicker upconversion. It is desirable to accurately measure the amplitude noise and uncorrelated phase noise in a radar system to understand the magnitude of the problem, as well as to reduce noise.

One type of radar system is a continuous-wave (CW) radar system. In a CW radar system, a transmitter transmits continuous wave radio energy, and a receiver receives reflections from objects. CW radar uses the Doppler shift, and maximizes power, because the transmission is continuous. CW radar may be unmodulated or frequency modulated. Unmodulated CW radar detects movement of objects, but cannot measure the distance of objects. Frequency-modulated continuous wave (FMCW) radar is a short/medium/long range measuring radar for determining distance and velocity of objects. In FMCW radar, the transmitted signal is a linear FMCW chirp sequence having a time-frequency characteristic of a saw tooth pattern. FMCW radar is useful in advanced driver-assistance systems (ADAS). In an FMCW radar system, a transmitted signal of a predetermined stable frequency varies in frequency over a fixed period of time by a modulating signal. The frequency difference between the received signal and the transmitted signal increases with delay, and hence with distance.

An example radar system utilizes a waveguide loopback to measure amplitude noise and uncorrelated phase noise. An example measures amplitude noise and uncorrelated phase noise without requiring external equipment. An embodiment is utilized by an FMCW radar communications transceiver, which transmits radar signals with a wavelength in the millimeter range.

Figure 2A:
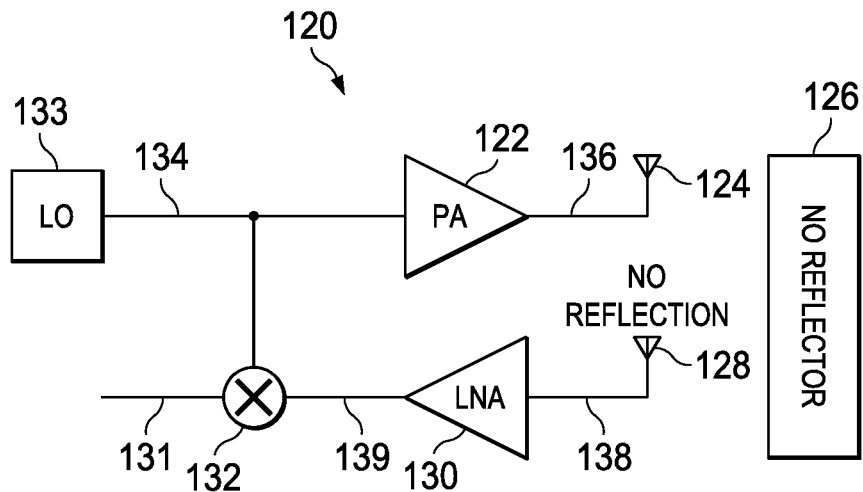
FIGS. 2A-C illustrate an example radar system with no reflector.
Figure 2B:
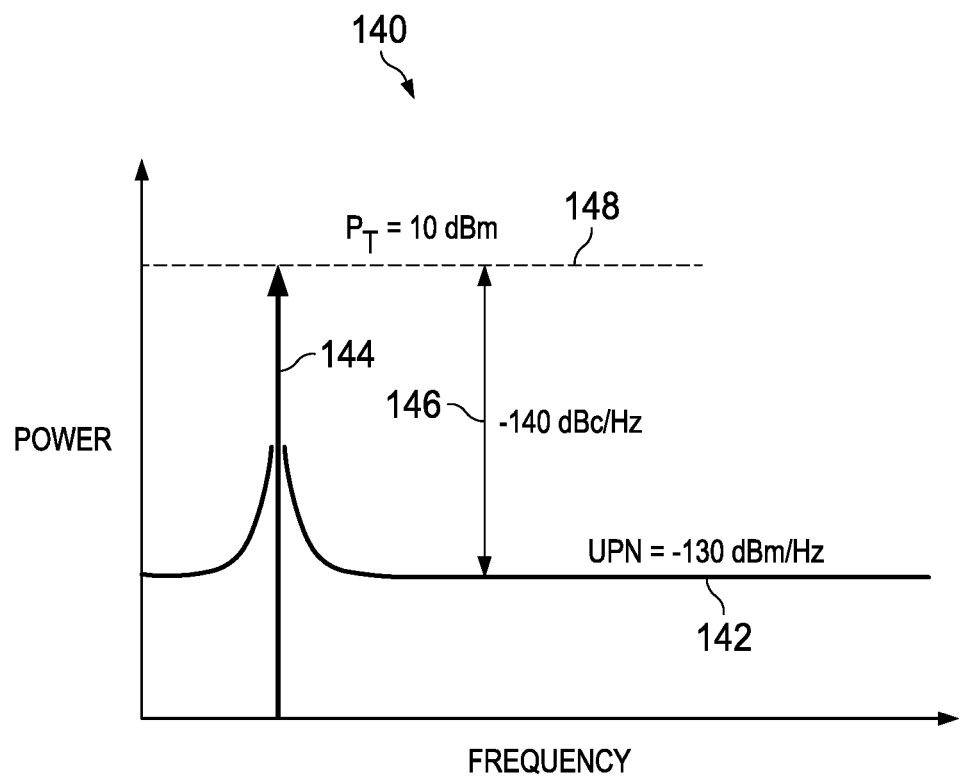
Figure 2C:
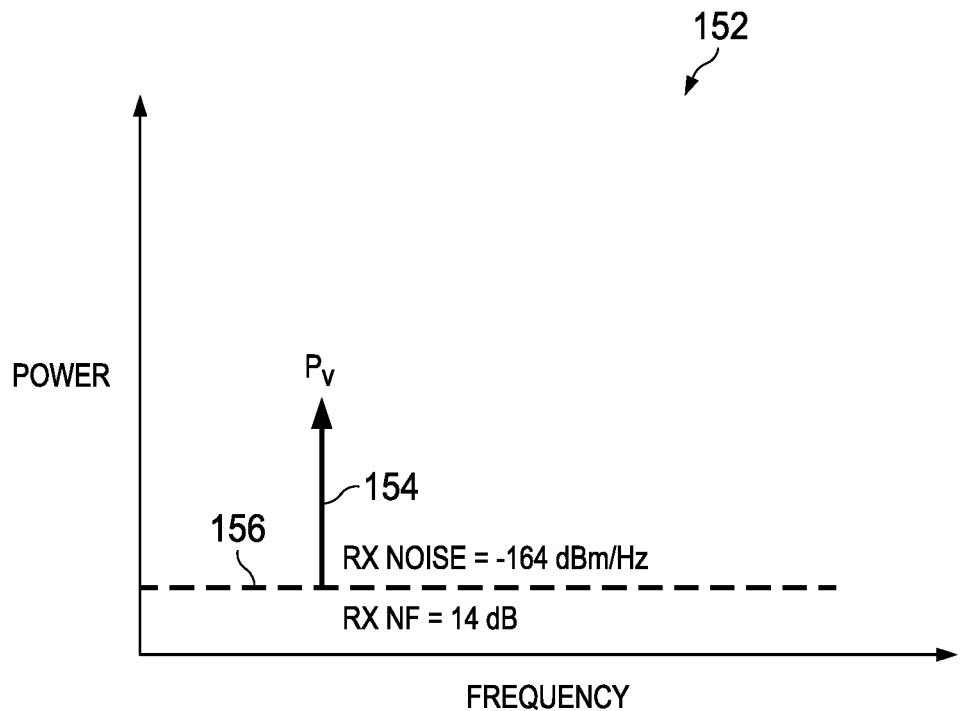

FIGS. 2A-C illustrate characteristics of an FMCW radar system without the presence of a reflector. FIG. 2A illustrates a radar system 120, which contains no reflector 126. The radar system 120 includes a local oscillator (LO) 133, a power amplifier (PA) 122, a TX antenna 124, an RX antenna 128, a low noise amplifier (LNA) 130, and a frequency mixer 132. The LO 133 generates an LO signal 134. The LO signal 134 is in the form of:

$$LO = \sin(\omega_1 t + \phi_1),$$

where t is time, $\omega_t$ is the carrier frequency, and $\phi_1$ is the phase noise of the LO 133. The PA 122 amplifies the LO signal 134 to generate an amplified signal 136. The PA 122 may be a multi-stage PA, for example a 5 stage PA containing multiple buffers. Multiple stages of a PA increase the gain and bandwidth, while maintaining appropriate input and/or output impedance matching. The values for output power, uncorrelated PN, and amplitude noise for an example radar system are depicted in FIG. 2B. FIG. 2B illustrates a graph 140, which depicts the noise in an amplified signal 136. Transmitted power ($P_T$) 148 of the amplified signal 136 is 10 dBm. Uncorrelated phase noise 142 is the difference 146, −140 dBc/Hz from the transmitted power 148, which is −130 dBm/Hz, and has a peak at a frequency 144. The TX antenna 124 transmits the amplified signal 136. In an example, the TX antenna 124 is a high gain narrow bandwidth antenna with a relatively large antenna size relative to the wavelength. These values are examples based on an example radar system, and may be different for different radar systems.

The RX antenna 128 receives a received signal 138. When there is no reflection, the received signal 138 contains only noise. FIG. 2C illustrates a graph 152 of the received signal 138. The graph 152 depicts an object 154, $P_v$, which is the signal from a radar operation when the radar is looking at a single object of interest. The object 154 has a RX noise of −164 dBm/Hz, with an RX noise floor 156 of 14 dB.

The LNA 130 amplifies the received signal 138, to generate an amplified received signal 139. The LNA 130 amplifies the low power received signal without significantly degrading the signal-to-noise (SNR) ratio. The LNA 130 may be a multi-stage LNA, for example a 3 stage LNA. The amplified received signal 139 is in the form of:

$$RX = \sin(\omega_2 t + \phi_2)$$

where t is time, $\omega_2$ is the frequency of the received signal, and $\phi_2$ is the phase noise of the received signal. Then, the frequency mixer 132 combines the amplified received signal 139 with the LO signal 134, to generate a combined signal 131, which is a beat-frequency signal. The combined signal 131 is in the form of:

$$\sin((\omega_1 - \omega_2)t + (\phi_1 - \phi_2)),$$

where t is time, $\omega_1$ is the carrier frequency, $\omega_2$ is the frequency of the received signal, $\phi_1$ is the phase noise of the LO 133, and $\phi_2$ is the phase noise of the received signal. The combined signal 131 may be digitized and subsequently processed, for example by a filter, an analog-to-digital (ADC) converter, and a digital signal processor (DSP) (not pictured). The beat frequency signal corresponding to each object is a tone having a frequency proportional to the distance of the object from the radar transceiver. Objects may be identified by taking a fast Fourier Transform (FFT) of the beat-frequency signal and identifying peaks that stand out from the noise floor. For moving objects, the beat-frequency signal also has a Doppler component that depends on the relative velocity between the radar transceiver and the object. The Doppler signal is obtained by performing a second FFT across chirps.

Figure 3A:
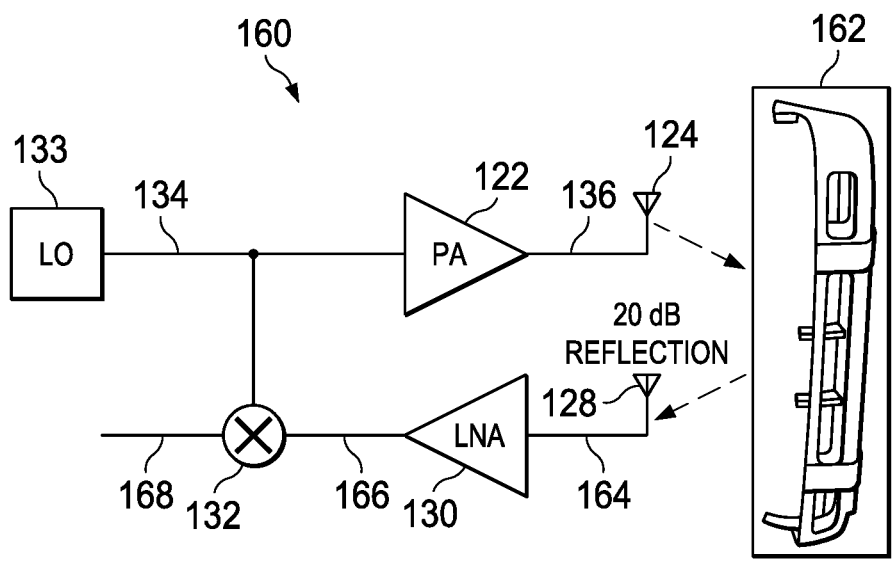
FIGS. 3A-B illustrate an example radar system with a reflector.
Figure 3B:
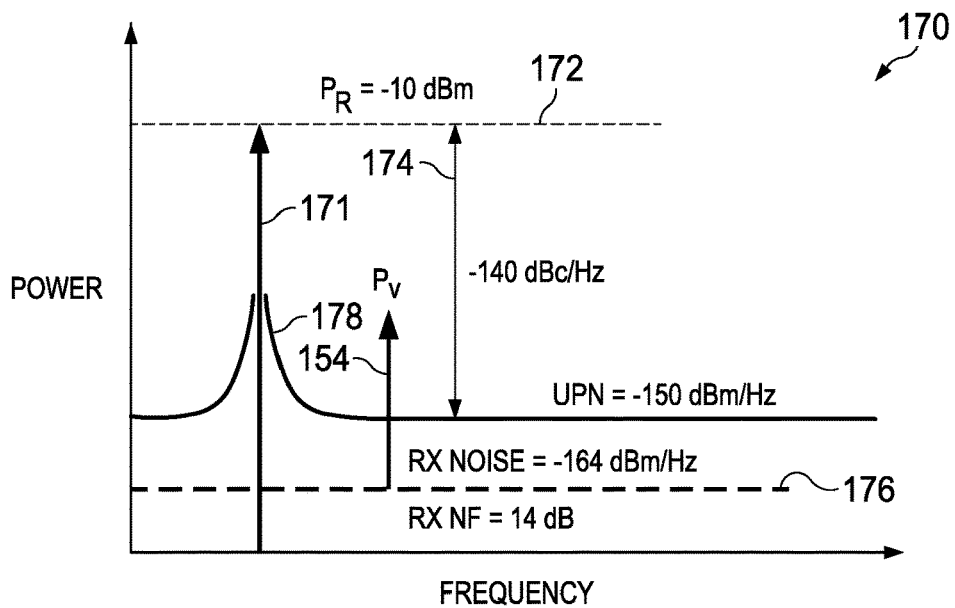

FIGS. 3A-B illustrate characteristics of an FMCW radar system in the presence of a reflector. FIG. 3B illustrates a radar system 160 with a reflector 162. The PA 122 amplifies the LO signal 134 generated by the LO 133, to generate an amplified signal 136. Then, the TX antenna 124 transmits the amplified signal 136 as a transmitted signal. The transmitted signal is reflected by the reflector 162, a strong reflector, for example a bumper of a vehicle. The RX antenna 128 receives the reflected signal and generates a received signal 164. The LNA 130 amplifies the received signal 164, to generate an amplified received signal 166. The frequency mixer 132 combines the amplified received signal 166 with the LO signal 134, to generate a combined signal 168.

The RX antenna 128 receives the received signal 164. FIG. 3B illustrates a graph 170, which depicts the power of the received signal 164. A line 172 illustrates the maximum received power (PR), which is −10 dBm. The line 172 is a distance 174, or −140 dBc/Hz, above the UPN, which is −150 dBm/Hz. A line 176 illustrates the received noise floor (RX NF), which is 14 dB. Also, a curve 178, which illustrates the received power, has a peak 171, indicating the received power reflected by an object. The noise of −140 dBc/hz carries over from the transmitted signal, leading to a noise floor of −150 dBm/Hz. Accordingly, the RX NF is 24 dB. In comparison, when there is no strong reflector, the noise floor of the RX is 10 dB lower, due to the system amplitude/uncorrelated phase noise. This 10 dB degradation severely impacts the radar system in terms of the maximum detectable range for small objects and the ability to detect small objects in the presence of larger objects near the small objects e.g. detection of a motor bike at a distance of 100 m with a bumper that is 10 cm, and a reflection coefficient of −20 dB.

Figure 4:
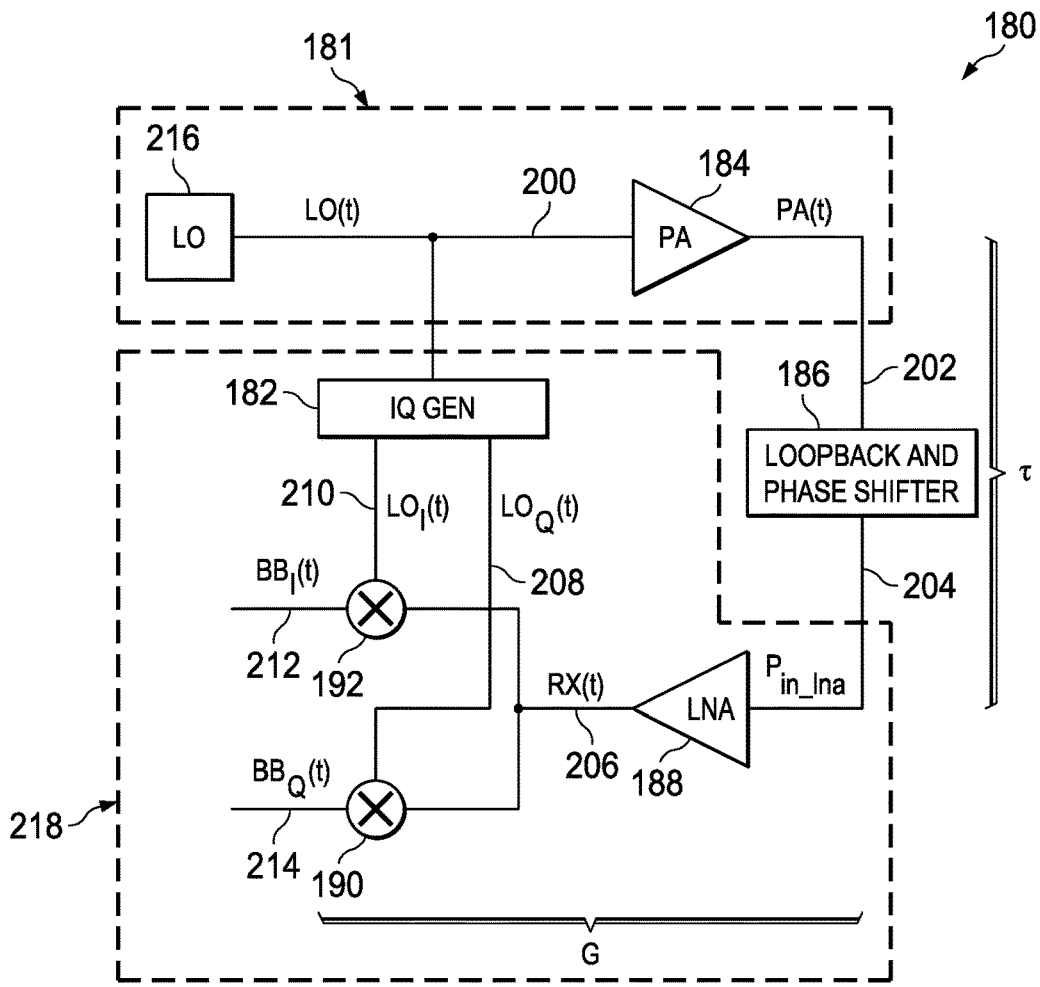
FIG. 4 illustrates an example radar system with a waveguide loopback for measuring amplitude noise and uncorrelated phase noise.

FIG. 4 illustrates a radar system 180, an FMCW radar system for measuring amplitude noise and uncorrelated phase noise. The radar system 180 includes a transmitter 181, a loopback and phase shifter 186, and a receiver 218. The transmitter 181 includes an LO 216 and a PA 184. The LO 216 generates an LO signal 200, represented by LO(t). The LO signal is:

$$LO(t)=\cos(\omega_o t+\phi_c(t)),$$

where $\omega_o$ is the carrier frequency of the LO, t is time, $\phi_c$ is the correlated phase noise of the LO.

The PA 184 amplifies the signal LO(t), to generate an amplified signal 202, given by PA(t). The PA 184 adds amplitude noise and uncorrelated phase noise to the signal, while amplifying the signal. The amplified signal 202 is given by:

$$PA(t)=A_{PA}(1+\Delta A_{PA})\cos(\omega_o t+\phi_{upa+}(t)+\phi_c(t)),$$

where $A_{PA}$ is the amplitude of the PA signal, t is time, $\Delta A_{PA}$ is the amplitude noise from the PA 184, $\omega_o$ is the carrier frequency of the LO 216, $\phi_{upa}$ is the uncorrelated phase noise of the PA 184, and $\phi_c$ is the correlated phase noise of the LO 216.

The loopback and phase shifter 186, which has a variable phase shift and a delay τ, loops the signal from the PA 184 of the transmitter 181 to an LNA 188 of the receiver 218. The loopback and phase shifter 186 guides the signal from the transmitter 181 to the receiver 218 with a predetermined delay and a predetermined variable phase shift. A looped back signal 204 enters the LNA 188 with a power of $P_{in\_lna}$.

The receiver 218 includes the LNA 188, an IQ generator 182, a frequency mixer 190, and a frequency mixer 192. The LNA 188 amplifies the looped back signal 204, to generate a receiver signal 206. The LNA 188 amplifies the low power received signal without significantly degrading the SNR. The LNA 130 may be a multi-stage LNA, for example a two, three, four, or five stage LNA. The LNA 130 may also include buffers and other elements. The receiver signal 206 is given by:

$$RX(t)=A(1+AA)\cos(\omega_o(t-\tau)-\theta+\phi_u(t)+\phi_c(t-\tau))$$

where A is the signal amplitude, ΔA is the amplitude noise, t is time, τ is the delay of the loopback and phase shifter 186, $\omega_o$ is the carrier frequency, θ is the phase shift from the loopback and phase shifter 186, $\phi_u$ is the uncorrelated phase noise, and $\phi_c$ is the correlated phase noise. The signal amplitude A is given by:

$$A=A_{PA}LG,$$

where $A_{PA}$ is the amplitude of the amplified signal 202, G is the gain of the receiver 218, including trace loss, and L is loss in the loopback and phase shifter 186. The radar system is aware of the value of G, a constant value. The amplitude noise of RX(t), ΔA, is the same as the amplitude noise of the PA 184, $\Delta A_{PA}$. Additionally, the uncorrelated phase noise of RX(t) is given by:

$$\phi_u(t-\tau)=\phi_u(t)=\phi_{upa}(t)+\phi_{lna}(t),$$

where $\phi_{upa}$ is the uncorrelated noise of the PA 184 and $\phi_{lna}$ is the uncorrelated phase noise of the LNA 188.

The IQ generator 182 generates an in phase (I) signal 210, $LO_I(t)$, and the quadrature (Q) signal 208, $LO_Q(t)$, for the LO signal 200, LO(t). The Q signal 208 signal is given by:

$$LO_Q(t)=\sin(\omega_o t+\phi_c(t)),$$

where $\omega_o$ is the carrier frequency of the LO 216, t is time, and $\phi_c$ is the correlated phase noise of the LO 216. Likewise, the I signal 210 is given by:

$$LO_I(t)=\cos(\omega_o t+\phi_c(t)).$$

The frequency mixer 192 combines the I signal 210 with the receiver signal 206, to generate the baseband I signal 212, $BB_I(t)$, given by:

$$BB_I(t)=A(1+\Delta A)\cos(\omega_o \tau+\theta+\phi_u(t)+\phi_c(t)-\phi_c(t-\tau)),$$

where A is the signal amplitude, ΔA is the amplitude noise, t is time, τ is the delay of the loopback and phase shifter 186, $\omega_o$ is the carrier frequency, θ is the phase shift from the loopback and phase shifter 186, $\phi_u$ is the uncorrelated phase noise, and $\phi_c$ is the correlated phase noise. Likewise, the frequency mixer 190 combines the Q signal 208 with the receiver signal 206, to generate the signal baseband Q signal 214, $BB_Q(t)$, which is given by:

$$BB_Q(t)=A(1+\Delta A)\sin(\omega_o \tau+\theta+\phi_u(t)+\phi_c(t)-\phi_c(t-\tau)),$$

where A is the signal amplitude, ΔA is the amplitude noise, t is time, τ is the delay of the loopback and phase shifter 186, $\omega_o$ is the carrier frequency, θ is the phase shift from the loopback and phase shifter 186, $\phi_u$ is the uncorrelated phase noise, and $\phi_c$ is the correlated phase noise. The loopback and phase shifter 186 includes a variable phase shifter, which may be adjusted by a user.

By configuring the loopback and phase shifter 186, the value of ($\omega_o t+\theta$) may be varied. In an example, to separate the phase noise and the amplitude noise, the phase shift of the loopback and phase shifter 186 is selected so that:

$$\omega_o \tau+\theta=0$$

With this condition in the phase shift, the baseband output of the I channel is given by:

$$BB_I(t)=A(1+\Delta A)\cos(\omega_o \tau+\theta+\phi_u(t)+\phi_c(t)-\phi_c(t-\tau)).$$

When:

$$\omega_o \tau+\theta=0.$$

the baseband output of the I channel is:

$$BB_I(t)=A(1+\Delta A)\cos(\omega_o \tau+\theta+\phi_u(t)+\phi_c(t)-\phi_c(t-\tau)).$$

Because the value of:

$$(\phi_u(t)+\phi_c(t)-\phi_c(t-\tau))$$

is a very small value, $$\cos(\phi_u(t)+\phi_c(t)-\phi_c(t-\tau))=1.$$

Accordingly, the baseband output of the I channel is:

$$BB_I(t)\approx A(1+\Delta A),$$

which is only amplitude noise.

Similarly, the baseband output of the Q channel is given by:

$$BB_Q(t)=A(1+\Delta A)\sin(\omega_o \tau+\theta+\phi_u(t)+\phi_c(t)-\phi_c(t-\tau)).$$

When $$\omega_o \tau+\theta=0,$$

the baseband output of the Q channel is:

$$BB_Q(t)=A(1+\Delta A)\sin(\phi_u(t)+\phi_c(t)-\phi_c(t-\tau)).$$

Because the value of:

$$(\phi_u(t)+\phi_c(t)-\phi_c(t-\tau))$$

is a very small value, $$\sin(\phi_u(t)+\phi_c(t)-\phi_c(t-\tau))=(\phi_u(t)+\phi_c(t)-\phi_c(t-\tau))$$

Accordingly, the baseband output of the Q channel is approximately:

$$A(1+\Delta A)(\phi_u(t)+\phi_c(t)-\phi_c(t-\tau)).$$

Equivalently, the baseband output of the Q channel is approximately:

$$A(\phi_u(t)+\phi_c(t)-\phi_c(t-\tau))+\Delta A(\phi_u(t)+\phi_c(t)-\phi_c(t-\tau))$$

Because both $\Delta A$ and:

$$(\phi_u(t)+\phi_c(t)-\phi_c(t-\tau))$$

are small numbers, the multiplication of two is a very small number. Accordingly, the baseband output of the Q channel is approximately:

$$A(\phi_u(t)+\phi_c(t)-\phi_c(t-\tau))$$

which is the phase noise. In this example, the amplitude noise is given by:

$$AN=\Delta A=\Delta A_{PA}$$

where $\Delta A_{PA}$ is the amplitude noise of the PA 184. Also, in this example, the phase noise is:

$$PN=\phi_u(t)+\phi_c(t)-\phi_c(t-\tau)$$

Additionally, in this example, the baseband I signal only has phase noise and baseband Q signal has only amplitude noise.

In another example, the phase shift of the loopback and phase shifter 186 is selected so that:

$$\omega_o\tau+\theta=90°$$

Then, amplitude noise will be on $BB_Q(t)$ and phase noise will be on $BB_I(t)$. The baseband output of the I channel is approximately:

$$A(\phi_u(t)+\phi_c(t)-\tau_c(t-\tau))$$

Also, the baseband output of the Q channel is approximately:

$$A(1+\Delta A)$$

In this example, the baseband I signal has only phase noise the baseband Q signal has only amplitude noise. As shown in the above examples, for every 90° rotation in phase shift the amplitude noise condition and the phase noise condition alternate between the I channel and the Q channel.

The phase shift of the loopback and phase shifter 186 may be varied at regular intervals, for example by steps of less than five degrees, to measure the baseband I noise and the baseband Q noise levels over various phase shifts. In some embodiments, smaller steps in phase shift, for example one degree, may be used. The noise power spectral density, in units of dBFs/Hz, of the baseband I and the baseband Q channels are plotted versus the phase shift. The maxima of the noise power spectral density (PSD) for either the I channel or the Q channel is $N_{max}$, and the minima of noise PSD is $N_{min}$.

The uncorrelated phase noise is given by:

$$UPN_{total}=P_{in\_lna}-N_{max}+10-G-6,$$

where $P_{in\_lna}$ is the power at the looped back signal 204, $N_{max}$ is the maxima of the PSD, 10 represents the conversion from dbM to dbFs, G is subtracted to obtain the noise at the input of the receiver, and the 6 is subtracted due to a scaling factor difference of 2 when a receiver downconverts a tone versus double side-band noise, such as amplitude noise or phase noise. Also, the amplitude noise is given by:

$$AN=P_{in\_lna}-N_{min}+10-G-6.$$

The synthesizer uncorrelated phase noise is given by:

$$UPN_{SYNTH}=PN_{SYNTH}+20\log_{10}(2\sin(\omega_o\tau/2)),$$

where $PN_{SYNTH}$ is measured phase noise of the LO signal 200, $\omega_o$ is the frequency of the LO signal 216, and $\tau$ is the delay introduced by loopback and phase shifter 186. $UPN_{total}$ is the total noise power due to $UPN_{SYNTH}$ and $UPN_{mmwave}$. The mmwave uncorrelated phase noise may be calculated by:

$$UPN_{mmwave}=UPN_{total}-UPN_{SYNTH}.$$

Figure 5:
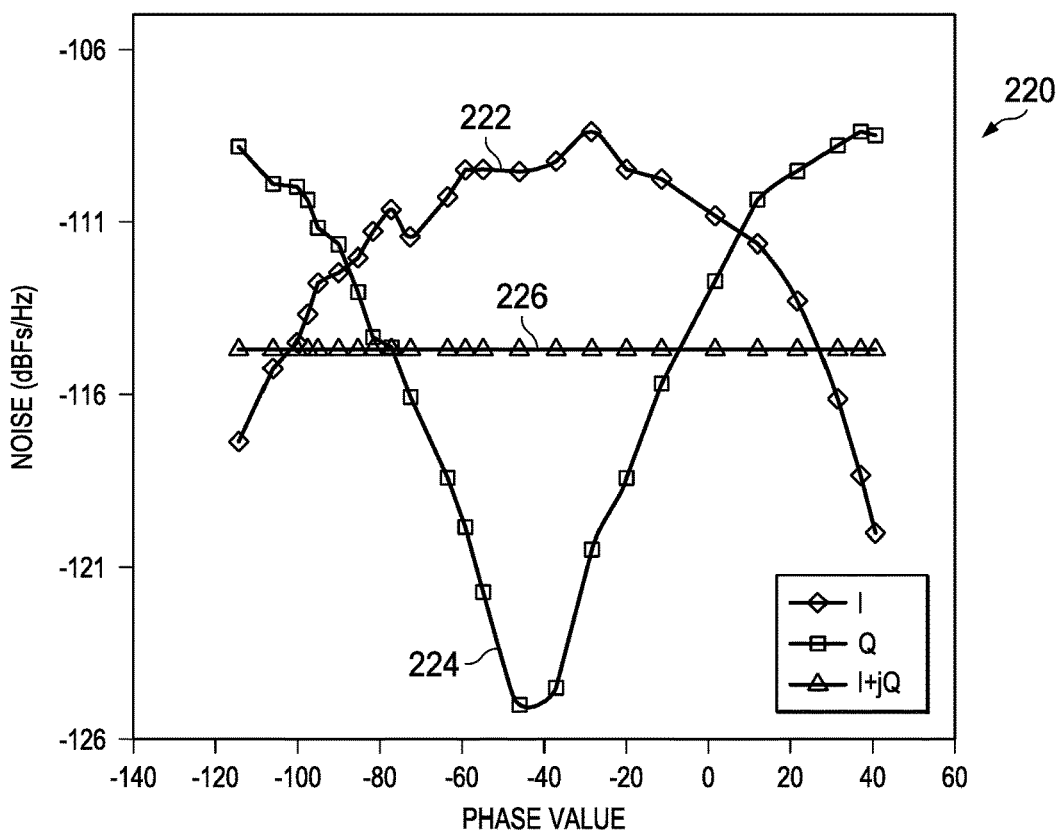
FIG. 5 illustrates a graph of noise in an example radar system with waveguide loopback.

Table 1, below, illustrates the phase shift, the phase value, the I noise value, the Q noise value, and the I+jQ noise value for an example radar system. Additionally, FIG. 5 illustrates a graph 220 for the I value, the Q value, and the I+jQ noise value versus phase shift. A curve 222 shows the I noise value, a curve 224 shows the Q noise value, and a curve 226 shows the I+jQ noise value. The maxima of the noise PSD on the I channel or on the Q channel, $N_{max}$ corresponds to phase noise, and the minima of the noise PSD on the I channel or on the Q channel, $N_{min}$, corresponds to amplitude noise. The value of $N_{max}$ is −125.03 dBFs/Hz, and the value of $N_{min}$ is −108.4 dBFs/Hz. In this example, $P_{in\_lna}$ is −13.333 dBm, with a carrier frequency co, of 78 GHz. The measured synthesized noise value $PN_{SYNTH}$ is −92 dBc/Hz. Also, the value of the amplitude $A_{PA}$ is 8 dBm. The gain G, measured at the receiver waveguide port, including the trace loss, with a 42 dB gain setting for the LNA 250, is 36 dB. Additionally, the range is measured to be 0.2622 for a slope of 50 MH/µs and a 2 Gigahertz bandwidth chirp. The delay $\tau$, measured by a ramp test, is 1.748 ns. The correlation factor (CF), given by:

$$CF=20\log_{10}(2\sin(\pi f\tau)),$$

is −39.19 dB. This leads to a value of $UPN_{SYNTH}$ of −131.19 dBc/Hz. The amplitude noise at the LNA is −151.63 dBm/Hz, and the uncorrelated phase noise at the LNA is −135 dBm/Hz. The noise folding factor, which is the noise on other carriers folding to 1 MHz at baseband, is 6. Additionally, the conversion factor from dBFs/Hz to dBm/Hz is 10. The amplitude noise is −144.296 dBc/Hz. The total uncorrelated phase noise is −127.666 dBc/Hz, the synth uncorrelated phase noise is −131.19 dBc/Hz, and the mmwave uncorrelated phase noise is −130.217 dBc/Hz.

TABLE 1

| Phase Shift | Phase Value | I (dBFs/Hz) | Q (dBFs/Hz) | I + jQ (dBFs/Hz) |
|---|---|---|---|---|
| 0 | −114 | −117.38 | −108.83 | −114.7 |
| 0.01 | −106 | −115.26 | −109.91 | −114.7 |
| 0.02 | −100 | −114.48 | −110 | −114.7 |
| 0.025 | −97.4 | −113.69 | −110.4 | −114.7 |
| 0.03 | −95 | −112.77 | −111.17 | −114.7 |
| 0.04 | −90 | −112.48 | −111.65 | −114.7 |
| 0.05 | −85 | −112.04 | −113.04 | −114.7 |
| 0.06 | −81.4 | −111.28 | −114.36 | −114.7 |
| 0.07 | −76.9 | −110.65 | −114.63 | −114.7 |
| 0.08 | −72.4 | −111.38 | −116.09 | −114.7 |
| 0.1 | −63.27 | −110.31 | −118.43 | −114.7 |
| 0.11 | −58.885 | −109.53 | −119.88 | −114.7 |
| 0.12 | −54.5 | −109.51 | −121.75 | −114.7 |
| 0.14 | −45.8 | −109.56 | −125.03 | −114.7 |
| 0.16 | −36.9 | −109.27 | −124.51 | −114.7 |
| 0.18 | −28.34 | −108.38 | −120.51 | −114.7 |
| 0.2 | −19.7 | −109.49 | −118.45 | −114.7 |
| 0.22 | −11.069 | −109.78 | −115.69 | −114.7 |
| 0.25 | 1.77 | −110.82 | −112.73 | −114.7 |
| 0.28 | 12.138 | −111.64 | −110.4 | −114.7 |
| 0.3 | 22 | −113.3 | −109.55 | −114.7 |

TABLE 1-continued

| Phase Shift | Phase Value | I (dBFs/Hz) | Q (dBFs/Hz) | I + jQ (dBFs/Hz) |
|---|---|---|---|---|
| 0.325 | 31.5 | −116.14 | −108.8 | −114.7 |
| 0.34 | 37.2 | −118.37 | −108.4 | −114.7 |
| 0.35 | 41 | −120.05 | −108.5 | −114.7 |

In an example, a simulation is performed on a radar system similar to the radar system 180 illustrated in FIG. 4. In the simulation, $\phi_c$ is −92 dBc/Hz. The PA amplitude, $A_{PA}$, is 8 dBm, the value of the PA amplitude noise, $\Delta A_{PA}$, is −144.5 dBc/Hz, the value of the uncorrelated phase noise for the PA, $\phi_{upa}$ is −140 dBc/Hz, and the value of the correlated noise, $\phi_c$, is −92 dBc/Hz. In the loopback 248, the loss L is −21.3 dB and the delay τ is 1.7 ns. Accordingly, the value of $A_{PA}L$ is −13.3 dBm, and the value of $A_{PA}L\Delta A_{PA}$ is −157.18 dBm/Hz. In the LNA 188, $UPN_{LNA}$ is −143.5 dBm/Hz and CF is −39.19 dB. Additionally, $A_{PA}L\phi_{UPA}$ is −153.3 dBm/Hz and $A_{PA}LO$, is −105.3 dBm/Hz. Also, the gain G is 36.6 and the low noise floor of the receiver and the IQ generator is 30.5. The receiver signal 206 is given by:

$$RX(t)=A(1+\Delta A)\cos(\omega_o(t-\tau)-\theta+\phi_u(t)+\phi_c(t-\tau)),$$

where $A=A_{PA}LG$ and $\Delta A=\Delta A_{PA}$. Additionally:

$$\phi_u(t-\tau)=\phi_u(t)=\phi_{upa}(t)+\phi_{lna}(t).$$

The amplitude noise is calculated to be −125.2 dBFs/Hz, and the uncorrelated phase noise is calculated to be −108.4 dBFs/Hz. Then, the synthesized UPN is calculated to be 111.9 dBFs/Hz, and the mmwave UPN is calculated to be −110.9 dBFs/Hz.

Figure 6:
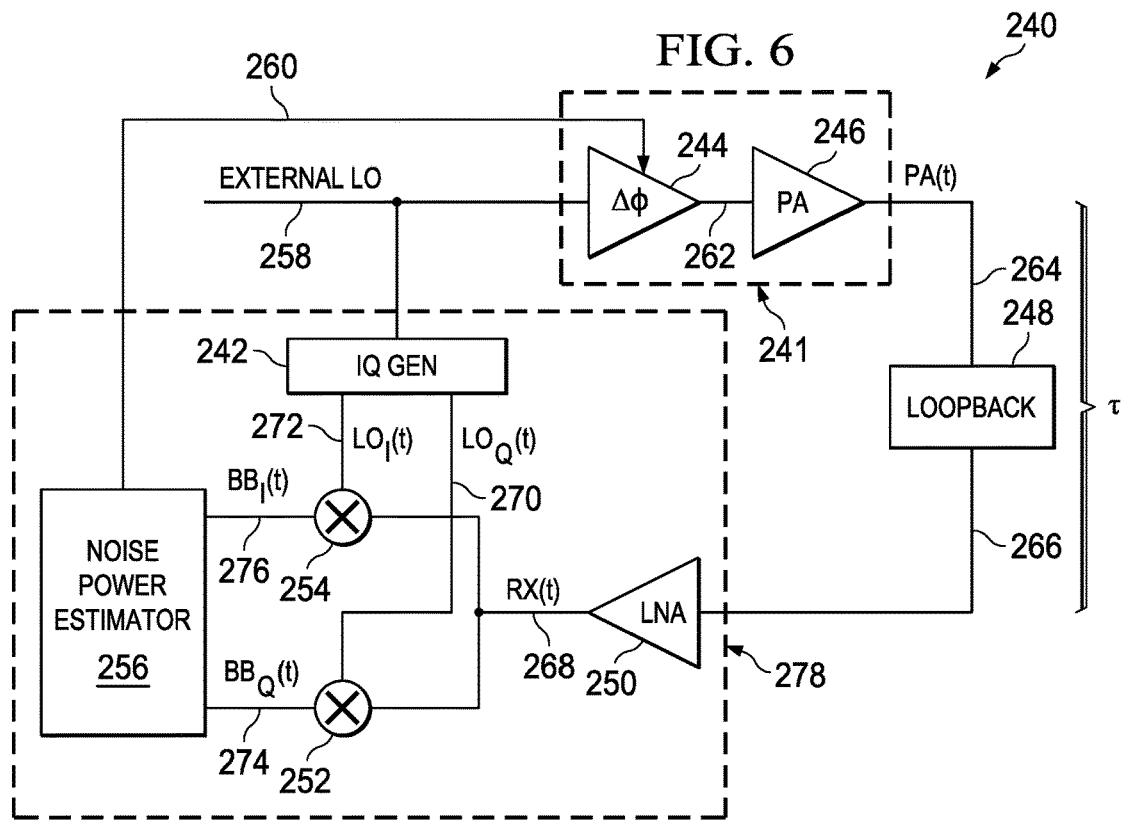
FIG. 6 illustrates another example radar system with a waveguide loopback for measuring amplitude noise and uncorrelated phase noise.

FIG. 6 illustrates a radar system 240. The radar system 240 includes a transmitter 241, a loopback 248, and a receiver 278. In the radar system 240, an external LO (not pictured) and an internal phase shifter, phase shifter 244 are used. An external LO, which is a low phase noise LO, for example a 20 GHz external LO, generates an input LO signal 258. The use of an external LO reduces or eliminates the correlated phase noise, improving the accuracy of the measurement of the uncorrelated phase noise. When a local LO is used, subtraction is performed between small quantities, potentially leading to large errors in the calculation of the uncorrelated phase noise. The transmitter 241 includes the phase shifter 244 and a PA 246. The phase shifter 244, an internal variable phase shifter, phase shifts the input LO signal 258 to generate the LO signal 262. Also, the phase shifter 244 is a variable phase shifter that receives a control signal 260 from the noise power estimator 256. The PA 246 amplifies the LO signal 262, to generate an amplified signal 264, denoted by PA(t).

The loopback 248 loops the looped back signal 266 from the transmitter 241 to the receiver 278. The loopback 248 has a predetermined delay r.

The receiver 278 includes an LNA 250, an IQ generator 242, a frequency mixer 252, a frequency mixer 254, and a noise power estimator 256. The LNA 250 receives the looped back signal 266 from the loopback 248, and amplifies the looped back signal 266, to generate a receiver signal 268, denoted by RX(t).

The IQ generator 242 generates an I signal 272, $LO_I(t)$, and a Q signal 270, $LO_Q(t)$, from the LO signal 258. Then, the frequency mixer 254 combines the I signal 272 with the receiver signal 268, to generate a baseband I signal 276, $BB_I$. Similarly, the frequency mixer 252 combines the Q signal 270 with the receiver signal 268, to generate the baseband Q signal 274, $BB_Q$.

The noise power estimator 256 measures the baseband I signal 276 and the baseband Q signal 274 for multiple phase shifts. For each phase shift, the noise power estimator 256 measures the I noise value and the Q noise value, and determines I+jQ noise value, where I is the I noise value and Q is the Q noise value. Additionally, the noise power estimator 256 controls the phase shift of the phase shifter 244 using the control signal 260, to step through the phase shifts, or to select an optimal phase shift. Also, the noise power estimator 256 determines the maximum noise, the phase shift corresponding to the maximum noise, the minimum noise, and the phase shift corresponding to the minimum noise. The noise power estimator 256 may cycle through various phase shifts to find the phase shift with the highest SNR.

In other embodiments, digital phase shifting is performed by the phase shifter 244. A digital phase shifter is digitally programmed to apply a phase shift to the signal.

The phase shift of the loopback and phase shifter 186 may be varied at regular intervals, for example by steps of less than five degrees, to measure the baseband I noise and baseband Q noise levels over various phase shifts. In some embodiments, smaller steps in phase shift, for example one degree, may be used. The noise power spectral density, in units of dBFs/Hz, of the baseband I and the baseband Q channels are plotted versus the phase shift. The maxima of the noise PSD is $N_{max}$, and the minima of noise PSD is $N_{min}$.

Similar to the previous example, the equations for $BB_I(t)$ and $BB_Q(t)$ in the may be derived for the radar system 240, illustrated by FIG. 6. The value of the baseband output of the I channel is given by:

$$BB_I(t)=A(1+\Delta A)\cos(\omega_o\tau+\theta+\phi_u(t)).$$

When:

$$\omega_o\tau+\theta=0,$$

the baseband output of the I channel is given by:

$$BB_I(t)=A(1+\Delta A)\cos(\phi_u(t)).$$

Because $\phi_u(t)$ is a very small value, the value of:

$$\cos(\phi_u(t))$$

is approximately 1. Accordingly, the baseband output of the I channel is approximately:

$$A(1+\Delta A)$$

which is only the amplitude noise.

Similarly, the baseband output of the Q channel is:

$$BB_Q(t)=A(1+\Delta A)\sin(\omega_o\tau+\theta+\phi_u(t)).$$

When $$\omega_o\tau+\theta=0$$

the baseband output of the Q channel is:

$$BB_Q(t)=A(1+\Delta A)\sin(\phi_u(t)).$$

Because $\phi_u(t)$ is a very small value, $$\sin(\phi_u(t))\approx\phi_u(t).$$

Accordingly, the baseband output of the Q channel is approximately:

$$A(1+\Delta A)(\phi_u(t)).$$

The baseband output of the Q channel may then be approximated by:

$$A(\phi_u(t))+\Delta A(\phi_u(t)).$$

Because $\Delta A$ and $\phi_u(t)$ are both small numbers, the multiplication of the two small numbers is very small. Then, the baseband output of the Q channel may be further approximated as:

$$A\phi_u(t),$$

which is only the phase noise.

When $$\omega_o\tau+\theta=90°$$

The baseband output of the I channel is approximately:

$$A\phi_u(t),$$

and the baseband output of the Q channel is approximately:

$$A(1+\Delta A).$$

The uncorrelated phase noise is given by:

$$UPN_{total}=P_{in\_lna}-N_{max}+10-G-6,$$

where $P_{in\_lna}$ is the power at the looped back signal 204, $N_{max}$ is the maxima of the PSD, 10 represents the conversion from dBm to dBFs, G is subtracted to obtain the noise at the input of the receiver, and the 6 is subtracted due to a scaling factor difference of 2 when a receiver downconverts a tone versus double side-band noise, such as amplitude noise or phase noise. Also, the amplitude noise is given by:

$$AN=P_{in\_lna}-N_{min}+10-G-6.$$

Because the LO signal is supplied by an external signal, $PN_{SYNTH}$ is negligible, and hence uncorrelated phase noise from SYNTH is also negligible. The synthesizer uncorrelated phase noise is given by:

$$UPN_{SYNTH}\sim 0.$$

The total uncorrelated phase noise in this case is mmwave uncorrelated phase noise, given by:

$$UPN_{mmwave}=UPN_{total}.$$

Figure 7:
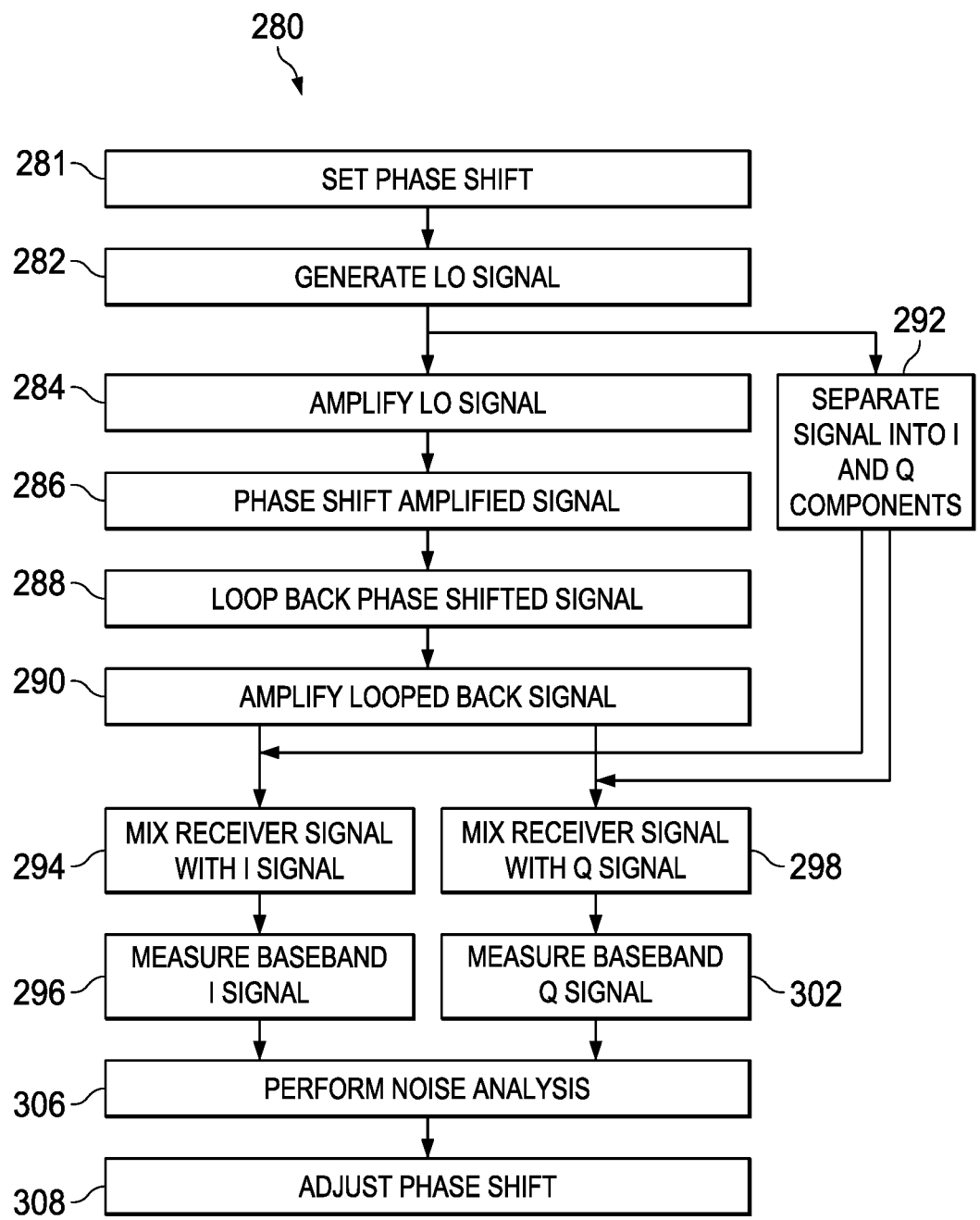
FIG. 7 illustrates a flowchart for an example method of measuring amplitude noise and phase noise in a radar system with waveguide loopback.

FIG. 7 illustrates a flowchart 280 for an example method of measuring noise in an FMCW radar system. In a block 281, the radar system sets the phase shift of a variable phase shifter. This may be done by a noise power estimator sending a control signal to the variable phase shifter, or by manually or otherwise automatically adjusting the phase shift of the variable phase shifter.

In a block 282, a radar system generates an LO signal. The LO signal may be locally generated by an LO embedded in a transmitter of a radar system. In another example, the LO signal is generated externally, and may be referred to as an input LO signal. The LO signal may have correlated phase noise.

In a block 284, a PA of a transmitter of the radar system amplifies the LO signal, to generate an amplified signal. In an embodiment, the PA is a multi-stage PA, for example a two stage PA, a three stage PA, a four stage PA, a five stage PA, a six stage PA, or a PA with a higher number of stages. The PA may include buffers and other elements. Additionally, the PA may generate amplitude noise and uncorrelated phase noise, along with the gain.

In a block 286, a phase shifter of the radar system shifts the phase of the amplified signal by a predetermined phase shift, to generate a phase shifted signal. In an embodiment, the phase shifter is adjustable, and multiple predetermined phase shift values are used. In some embodiments, the phase shifting is performed before the amplification in the block 284, in the transmitter of the radar system, generating the LO signal. In other embodiments, the phase shifting is performed after the amplification in the block 284, and the amplification is performed by a phase shifter external to the transmitter, in a waveguide loopback of the radar system. In one example, the phase shifter is an analog phase shifter. In another example, the phase shifter is a digital phase shifter.

In a block 288, a waveguide loopback loops back the phase shifted signal to the receiver of the radar system from the transmitter of the radar system, as a looped back signal, using an mmwave waveguide loopback. The looped back signal has a predetermined delay, along with a predetermined phase shift. The waveguide loopback also introduces a loss to the signal.

In a block 290, an LNA of the receiver of the radar system amplifies the looped back signal generated in the block 288, to generate a receiver signal. The LNA may be a multi-stage LNA. For example, the LNA may be a two stage LNA, a three stage LNA, a four stage LNA, a five stage LNA, or an LNA with a higher number of stages. The LNA may include additional elements, such as buffers. The LNA introduces additional uncorrelated phase noise to the signal, along with additional gain.

In a block 292, an IQ generator separates an I component from the LO signal, to generate an I signal. The IQ generator also separates a Q component from the LO signal, to generate a Q signal.

In a block 298, a frequency mixer mixes the receiver signal, amplified by the LNA in block 290, with the Q signal generated in the block 292, to generate a baseband Q signal. Then, in a block 302, the system measures the baseband Q signal, as a measured Q signal. The measurement may be performed by the radar system, for example by a noise power estimator of the radar system. In another example, the signal is measured externally, for example by a signal analyzer.

Likewise, in a block 294, another frequency mixer mixes the receiver signal, from the block 290, with the I signal generated in the block 292, to generate a baseband I signal. Then, in a block 296, the system measures the baseband I signal, as a measured I signal. The measurement may be performed by the radar system, for example by a noise power estimator of the radar system. In another example, the signal is measured externally, for example by a signal analyzer.

In a block 306, the radar system performs noise analysis. For example, the radar system may plot the baseband Q signal versus the phase shift value. Additionally, the radar system may plot the baseband I signal versus the phase shift. The system may also perform additional analysis. For example, the system may calculate the maximum and minimum I and Q noise values. From these values, the system may calculate the amplitude noise and the uncorrelated phase noise. In example, the radar system determines the total noise based on the measured I signal from the block 302 and the measured Q signal from the block 296. The total noise is equal to I+jQ, where I is the measured I signal and Q is the measured Q signal. In one embodiment, the analysis is performed by the radar system, for example as a part of the noise power estimator. In another example, the analysis is performed externally, for example on a general purpose computer, or on a specialized computing device, such as a digital signal processor (DSP).

In a block 308, the radar system adjusts the phase shift based on the measured I signal and the measured Q signal. In one embodiment, the phase shift is manually adjusted. In another example, the phase shift is automatically adjusted, for example by a noise power estimator generating a control signal for the variable phase shifter. The phase shifter may be stepped through multiple steps to find the maxima and minima for the noise. For example, the phase is stepped in increments of less than five degrees, for example steps of one degree, two degrees, three degrees, or four degrees. In one embodiment, smaller phase steps are used close to the noise minima to better determine the phase shift for the minimum noise. When the phase for the minimum noise is determined, that phase may be used to improve performance.

Figure 8:
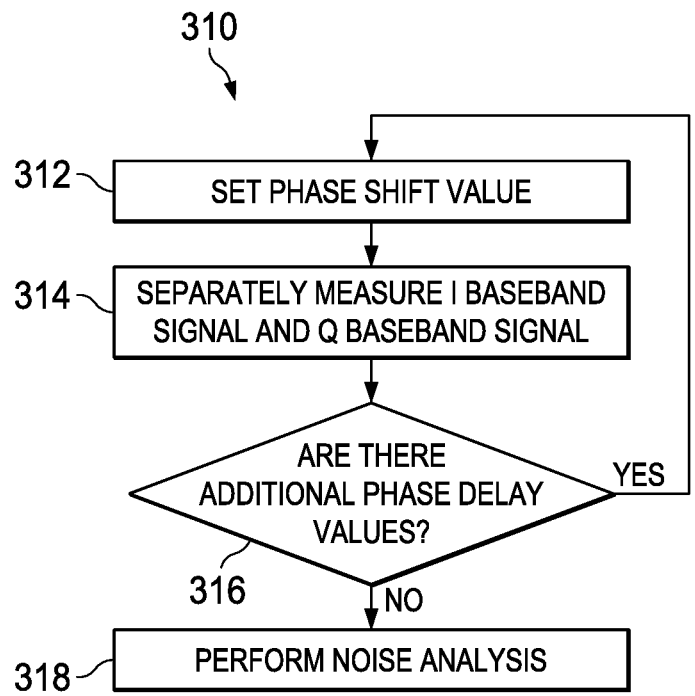
FIG. 8 illustrates a flowchart for another example method of measuring amplitude noise and phase noise in a radar system with waveguide loopback.

FIG. 8 illustrates a flowchart 310 for an example method of determining noise in a radar system. In a block 312, the radar system sets a phase shift value for a variable phase shifter. In one embodiment, the phase shift value is set manually. In another example, the phase shift value is set automatically, for example based on a phase shift control signal output by a noise power estimator, or by another control signal.

In a block 314, the radar system separately measures the baseband I signal and the baseband Q signal. The radar system loops back a looped back signal from the transmitter of the radar system to the receiver of the radar system with a predetermined delay and a predetermined variable phase shift. The radar system modulates the looped back signal with an I signal and with a Q signal, which are generated from an LO signal. The radar system measures the baseband I signal separately from the baseband Q signal. The radar system may convert the measured I signal and the measured Q signal from analog to digital, for example using an ADC. The radar system may process the digital signals, for example using a DSP or by a general purpose computer. Additionally, the radar system may store the measured I signal and the measured Q signal in memory for later analysis. The radar system may also take other measurements. For example, the radar system may measure the power level at the input of the LNA, to obtain the value of $P_{in\_lna}$. Also, the radar system may measure the phase noise of the LO signal. Additionally, the radar system may measure the value of T.

In a block 316, the radar system determines whether there are additional phase values to be used to measure additional baseband I signals and baseband Q signals. In one example, the radar system steps through the phase shift values. The phase shift values may be adjusted in steps smaller than five degrees. In one embodiment, the phase shift steps are dynamically adjusted. For example, larger steps may be taken initially, and smaller steps may be used closer to an expected minima or maxima. When there are additional phase shift values, the radar system returns to the block 312 to set the next phase delay values. On the other hand, when there are not additional phase delay values, the radar system proceeds to a block 318.

In the block 318, the radar system performs noise analysis. For example, from the noise calculated on the I channel using the block 296, and the noise calculated on the Q channel using the block 302, at the various delay values, the minima ($N_{min}$) for noise, the phase shift corresponding to the minimum noise value, the maxima ($N_{max}$) for noise, and the phase shift corresponding to the maximum noise value, are determined. The value of $N_{min}$ corresponds to the amplitude noise, and the value of $N_{max}$ corresponds to the uncorrelated phase noise. The amplitude noise may be calculated using the equation:

$$AN = P_{in\_lna} - N_{min} + 10 - G - 6,$$

where $P_{in\_lna}$ is the noise value at the input of the LNA, G is the gain, and $N_{min}$ is the minimum noise.

Additionally, the uncorrelated phase noise is calculated based on the equation:

$$UPN_{total} = P_{in\_lna} - N_{max} + 10 - G - 6.$$

The synthesized phase noise can be determined to be:

$$UPN_{SYNTH} = \phi_c + 20\log_{10}\left(2\sin\left(\frac{\omega_{offset}\tau}{2}\right)\right),$$

where $\tau$ is the delay, $\omega_{offset}$ is the offset frequency, and $\phi_c$ is the correlated phase noise. The correlated phase noise can be measured at the input of the PA. Additionally, the mmwave uncorrelated phase noise can be determined to be: $UPN_{mmwave} = UPN_{total} - UPN_{SYNTH}$. In an example, the radar system may calculate the total noise to be I+jQ, where I is the measured I signal and Q is the measured Q signal.

Figure 9:
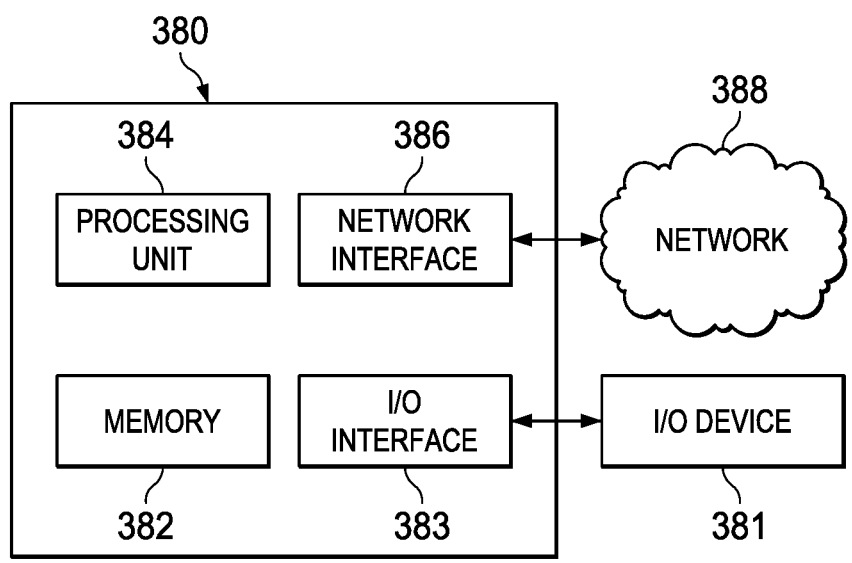
FIG. 9 illustrates an example computing device.

FIG. 9 illustrates a block diagram of a computing device 380. The computing device 380 may be used for performing analysis and control steps. For example, the computing device 380 may be used to perform blocks the 312, 316, and 318 of the flowchart 310. In at least one example, the computing device 380 is a general purpose computer. In other examples, the computing device 380 is a programmed machine that executes a specific task or set of tasks, such as an application specific integrated circuit (ASIC). In another example, the computing device 380 is a microcontroller with embedded instruction. The computing device 380 may be a DSP. The computing device 380 includes a memory 382 for storing data and machine-readable instructions. The memory 382 may store other information, such as measurement values. The computing device 380 also includes a processing unit 384 that accesses the memory 382 and executes the machine-readable instructions. The memory 382 is a non-transitory computer-readable storage medium. In some examples, the memory 382 is volatile memory, such as random access memory, non-volatile memory, such as a hard disk drive, a solid state drive, or flash memory, or a combination thereof.

Additionally, the computing device 380 includes an input/output (I/O) interface 383 for interaction with an I/O device 381. The I/O device 381 may be a monitor, touch-screen display, mouse, keyboard, printer, or other I/O device, such as a signal analyzer or a controller. The processing unit 384 is implemented as one or more processor cores, for example x86, ARM, or DSP. In an embodiment, the computing device 380 includes a network interface 386 for communicating on a network 388. Embodiments may include multiple computing devices communicating over a network. The network interface 386 may be implemented as a network interface card (NIC). In some examples, the network 388 is implemented as a public network, a private network, or a combination thereof. In some examples, the computing device 380 is implemented in cloud computing.

Although the invention has been described in detail, it should be understood that various changes, substitutions and alterations can be made thereto without departing from the spirit and scope of the invention as defined by the appended claims.

What is claimed is:

1. A radar system comprising:
 a transmitter comprising a first amplifier configured to amplify a local oscillator (LO) signal, to generate an amplified signal;
 a receiver comprising:
 an IQ generator configured to generate an I signal based on the LO signal and to generate a Q signal based on the LO signal;

a second amplifier configured to amplify a looped back signal, to generate a receiver signal;
a first mixer configured to mix the receiver signal and the I signal, to generate a baseband I signal;
a second mixer configured to mix the receiver signal and the Q signal, to generate a baseband Q signal; and
a noise power estimator configured to:
measure I noise values of the baseband I signal, wherein each of the I noise values corresponds to one of a plurality of phases;
measure Q noise values of the baseband I signal, wherein each of the Q noise values corresponds to one of the plurality of phases;
determine a maximum noise value of the I noise values and the Q noise values:
determine a minimum noise value of the I noise values and the Q noise values:
calculate an uncorrelated phase noise based on the maximum noise value; and
calculate an amplitude noise based on the minimum noise value; and
a waveguide loopback configured to guide the amplified signal from the transmitter to the receiver as the looped back signal.

2. The radar system of claim 1, wherein the waveguide loopback comprises a variable phase shifter configured to phase shift the amplified signal.

3. The radar system of claim 1, wherein the transmitter further comprises a variable phase shifter configured to phase shift an input LO signal.

4. The radar system of claim 3, wherein the noise power estimator is further configured to:
determine the plurality of phases; and
transmit phase shift indicators to the variable phase shifter, wherein the phase shift indicators correspond to the plurality of phases.

5. The radar system of claim 4, wherein the noise power estimator is further configured to:
determine a minimum noise phase shift corresponding to the minimum noise value; and
transmit a minimum noise phase shift indicator to the variable phase shifter, wherein the minimum noise phase shift indicator indicates the minimum noise phase shift for reducing noise.

6. A method comprising:
setting a phase shift of a variable phase shifter of a radar system;
measuring, by a processor, I noise values for a baseband I signal, wherein each of the I noise values corresponds to one of the phase shifts of an amplified looped back phase shifted radar signal;
measuring, by the processor, Q noise values for a baseband Q signal, wherein each of the Q noise values corresponds to one of the phase shifts of the amplified looped back phase shifted radar signal;
determining a maximum noise value of the I noise values and the Q noise values;
determining a minimum noise value of the I noise values and the Q noise values;
determining an uncorrelated phase noise based on the maximum noise value; and
determining an amplitude noise based on the minimum noise value.

7. The method of claim 6, wherein the processor is a noise power estimator of the radar system.

8. The method of claim 6, further comprising:
measuring a power value at an input of an amplifier of the radar system; and
determining a total uncorrelated phase noise based on the power value at the input of the amplifier, the maximum noise value, and a receiver gain of a receiver of the radar system, wherein the receiver comprises the amplifier.

9. The method of claim 8, further comprising:
measuring phase noise of a local oscillator (LO) signal; and
determining synthesizer uncorrelated phase noise based on a delay of a waveguide loopback of the radar system, the phase noise of the LO signal, and an offset frequency.

10. The method of claim 9, further comprising determining millimeter wave (mmwave) noise based on the total uncorrelated phase noise and based on the synthesizer uncorrelated phase noise.

11. The method of claim 9, wherein determining the amplitude noise is based on the power value at the input of the amplifier and the receiver gain.

12. The method of claim 6, further comprising:
selecting a minimum noise phase shift corresponding to the minimum noise value.

13. A radar system comprising:
a first amplifier comprising an input terminal and an output terminal;
a variable phase shifter coupled to the first amplifier;
a second amplifier comprising an input terminal and an output terminal;
a waveguide loopback coupling the output terminal of the first amplifier to the input terminal of the second amplifier;
a first frequency mixer comprising:
a first input terminal coupled to the output terminal of the second amplifier;
a second input terminal; and
an output terminal;
a second frequency mixer comprising:
a first input terminal coupled to the output terminal of the second amplifier;
a second input terminal; and
an output terminal; and
an IQ generator comprising:
an input terminal;
a first output terminal coupled to the second input terminal of the first frequency mixer; and
a second output terminal coupled to the second input terminal of the second frequency mixer.

14. The radar system of claim 13, further comprising a noise power estimator coupled to the first frequency mixer, to the second frequency mixer, and to the variable phase shifter.

15. The radar system of claim 13, wherein the variable phase shifter is in the waveguide loopback.

16. The radar system of claim 13, wherein the first amplifier is coupled between the variable phase shifter and the waveguide loopback.

17. The radar system of claim 13, further comprising a local oscillator (LO) coupled to the input terminal of the first amplifier and to the input terminal of the IQ generator.

18. The radar system of claim 13, wherein the input terminal of the first amplifier and the input terminal of the IQ generator are coupled to an external LO generator.

* * * * *